(12) United States Patent
Horvath et al.

(10) Patent No.: US 6,223,757 B1
(45) Date of Patent: May 1, 2001

(54) TOY CAR WASH APPARATUS

(76) Inventors: Roger C. Horvath; Joseph R. Horvath, both of 363 Horseshoe Dr., Mason, OH (US) 45040

( * ) Notice: Subject to any disclaimer, the term of this patent is extended or adjusted under 35 U.S.C. 154(b) by 0 days.

(21) Appl. No.: 09/270,892

(22) Filed: Mar. 15, 1999

(51) Int. Cl.⁷ .................................................. B08B 3/02
(52) U.S. Cl. ..................... 134/123; 134/198; 134/199; 134/201; 446/423
(58) Field of Search ................. 134/45, 123, 199, 134/198, 201; 446/423; 15/53.1, DIG. 2

(56) References Cited

U.S. PATENT DOCUMENTS

| | | | |
|---|---|---|---|
| Re. 23,294 | * 11/1950 | Hopper et al. | 134/123 |
| D. 331,950 | 12/1992 | Baker . | |
| 2,708,446 | * 5/1955 | Phillips | 134/123 |
| 3,353,546 | * 11/1967 | Mahoney | 134/123 |
| 3,934,297 | 1/1976 | Hanna . | |
| 4,356,657 | * 11/1982 | Goldfarb et al. . | |
| 4,369,801 | * 1/1983 | Jones et al. | 134/123 |
| 4,715,391 | * 12/1987 | Scheller | 134/123 |
| 4,889,147 | * 12/1989 | Chandler . | |
| 5,015,210 | * 5/1991 | Dideriksen . | |
| 5,154,671 | 10/1992 | Smollar et al. . | |
| 5,213,547 | 5/1993 | Lochtefeld . | |
| 5,337,437 | * 8/1994 | Hingle . | |
| 5,339,478 | 8/1994 | Schleeter . | |
| 5,401,214 | 3/1995 | Smollar et al. . | |
| 5,480,336 | 1/1996 | Blanchard . | |
| 5,638,843 | * 6/1997 | Strickland | 134/123 |
| 5,649,867 | 7/1997 | Briggs . | |

FOREIGN PATENT DOCUMENTS

| | | | |
|---|---|---|---|
| 244171 | * 4/1965 | (AT) | 134/123 |
| 437672 | * 3/1926 | (DE) | 134/123 |
| 22963 | * 11/1956 | (DE) | 134/123 |

\* cited by examiner

Primary Examiner—Frankie L. Stinson
(74) Attorney, Agent, or Firm—Dale J. Ream

(57) ABSTRACT

A toy car wash apparatus includes a plurality of hollow tubes and a plurality of hollow connectors for connecting the tubes together to form a framework having an open front and open back. The apparatus includes an adapter for connecting the apparatus to a water source under pressure. A plurality of water nozzles are coupled to various tubes for dispensing water into an interior space defined by the framework. An actuator is rotatably coupled to each nozzle such that rotation of the actuator selectively adjusts the flow of water dispensed from the nozzle. A pair of wheels are pivotally attached to one end of the framework which in a vertical position for permitting lateral and longitudinal placement of the apparatus. The wheels are pivotally retractable for allowing the framework to bear against a ground surface following placement of the framework. A variety of other water dispensing devices can be mounted to the framework.

11 Claims, 7 Drawing Sheets

TOY CAR WASH APPARATUS

BACKGROUND OF THE INVENTION

This invention relates generally to outdoor toyvehicle cleaning devices and, more particularly, to a portable toy car wash apparatus which simulates an actual car wash for the entertainment of small and pre-teenage children.

A particularly desirable activity for most children is assisting a parent with washing a vehicle. In fact, many children will wash their bicycles or toy cars in conjunction with the washing of the vehicle by a parent. Of course, these activities often coincide with cooling off under the spray of a garden hose.

Various devices have been proposed in the prior art which provide structures for dispensing water in an entertaining manner as in U.S. Pat. Nos. 5,649,867 and 5,480,336 to Briggs and Blanchard, respectively. Existing devices, however, do not provide individual control over the flow of water through each water dispensing outlet of the apparatus. In addition, the devices referenced above are not structurally adapted for a child to slide or to maneuver a toy car through.

It is therefore desirable to have a toy car wash apparatus in which individual water dispensing nozzles can be adjusted to a desired water flow. It is also desirable to have a toy car wash apparatus through which a child can slide or maneuver a toy car or bicycle. A toy car wash should be easily movable to desired locations for use or storage.

SUMMARY OF THE INVENTION

A toy car wash apparatus constructed in accordance with the present invention utilizes a housing which presents a top and a pair of opposed side walls that define an open front and back. The housing comprises a plurality of rigid tubes having various lengths that are coupled together with connectors of various configurations to form a generally U-shaped framework indicative of an actual drive-through type car wash. Each connector presents at least two hollow ends having identical interior diameters. The ends of each tube present identical exterior diameters and are sized to mate tightly with ends of the connectors. An adapter is configured to connect a tube to a water source, such as a garden hose, such that the entire framework can be filled with water.

A plurality of valves is coupled to various tubes for dispensing water into the interior space defined by the housing. An actuation head is attached to each valve such that a user can incrementally adjust the water stream dispensed by the valve by rotating the head. Other water dispensing devices, such as a rotating sprinkler and wand-type sprayers are also communicatively mounted to the framework.

The framework defines an open front and back through which a user can slide or maneuver a play object. A slide can extend through the open ends and be releasably attached to the framework if desired. Wheel assemblies are pivotally mounted to the base of the framework at one end. The wheel assemblies are retractable to a horizontal position parallel to the ground such that the framework bears against the ground and is thus not freely movable during use. The wheel assemblies can also be moved to a vertical position which elevates one end of the framework, allowing the lateral and longitudinal placement of the framework by lifting the opposed end and rolling the wheel supported end.

It is therefore a general object of this invention to provide a toy car wash apparatus that replicates an actual car wash for the entertainment of children.

Another object of this invention is to provide a toy car wash apparatus, as aforesaid, which presents a framework through which a child can slide or maneuver a toy object.

Still another object of this invention is to provide a toy car wash apparatus, as aforesaid, having wheels adapted for lateral and longitudinal movement of the apparatus to a desired location.

A further object of this invention is to provide a toy car wash apparatus, as aforesaid, which maintains its configuration during movement to a desired location.

Yet another object of this invention is to provide a toy car wash apparatus, as aforesaid, the framework of which presents a network of tubes through which water is carried and dispensed.

A further object of this invention is to provide a toy car wash apparatus, as aforesaid, which can dispense water at selectively variable flow rates from a plurality of nozzles positioned about the framework of the apparatus.

A still further object of this invention is to provide a toy car wash apparatus, as aforesaid, the framework of which presents an aesthetically attractive cover.

Another object of this invention is to provide a toy car wash apparatus, as aforesaid, which presents a variety of different water dispensing components.

Still another object of this invention is to provide a toy car wash apparatus, as aforesaid, which can dispense water from a variety of angles relative to a user.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
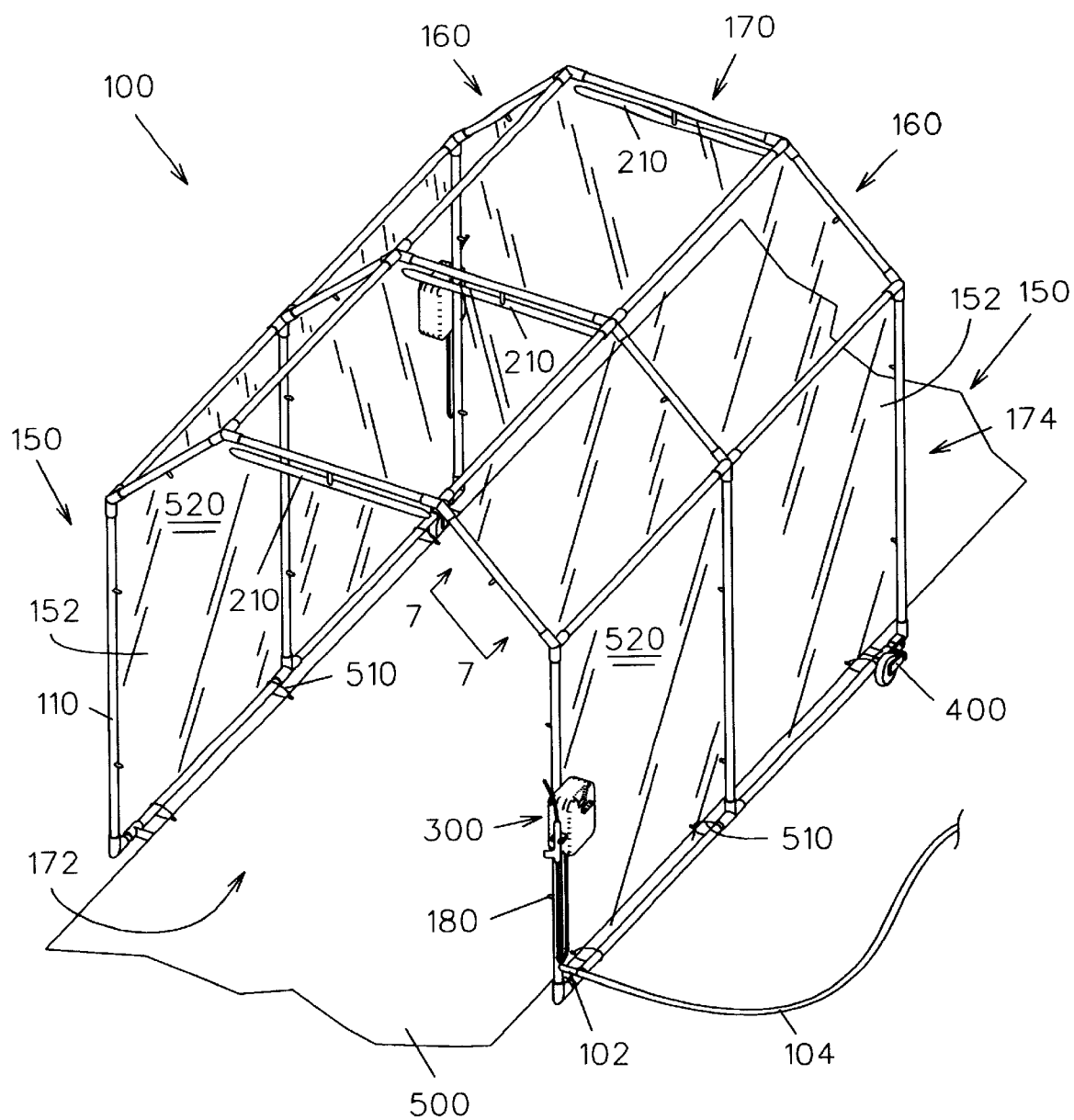
FIG. 1 is a perspective view of a toy car wash apparatus in accordance with a preferred embodiment of the present invention.
Figure 2:
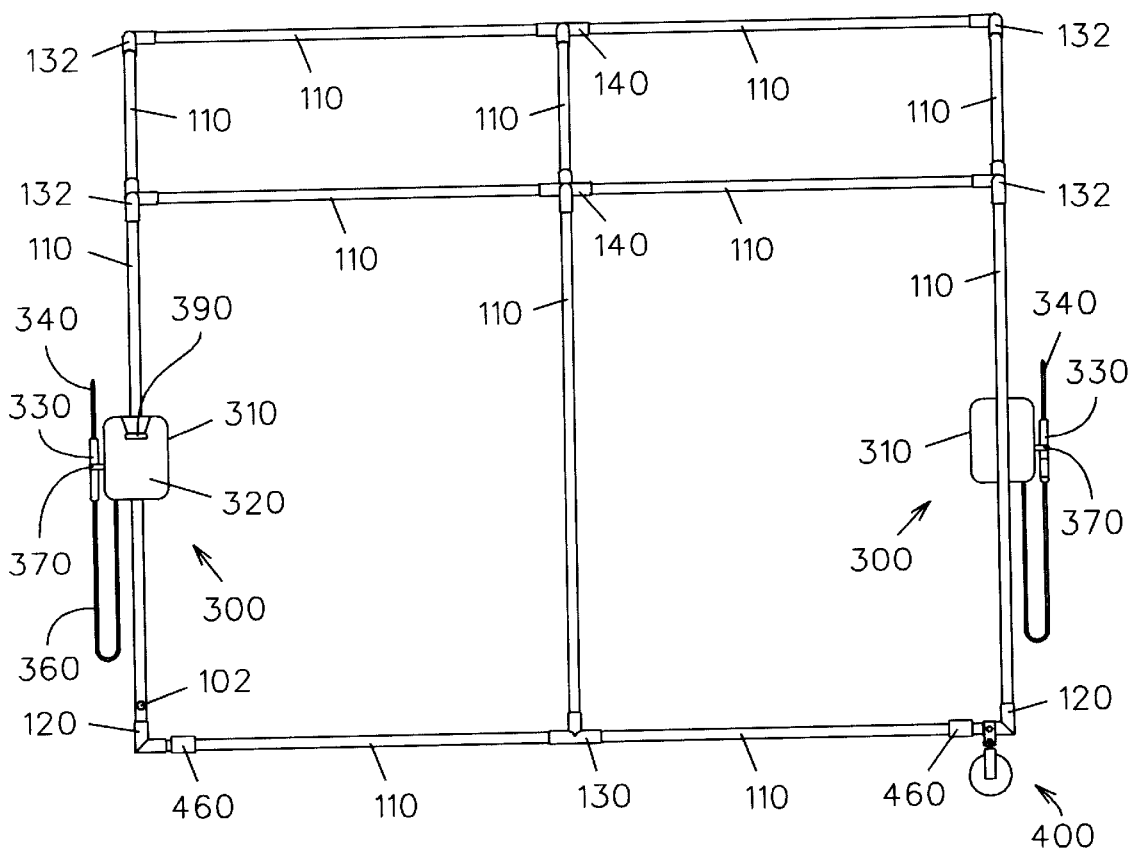
FIG. 2 is a right side view of the apparatus of FIG. 1.

A toy car wash apparatus 100 constructed in accordance with a preferred embodiment of the present invention is shown in FIGS. 1 through 4. The apparatus 100 comprises a housing having a top portion 170 and opposed side portions 150 defining first 172 and second 174 open ends. Each side portion 150 includes a first upstanding segment 152 and a second sloped segment 160 intermediate the top portion 170 and the first side segment 152. The housing includes a plurality of rigid tubes 110 having various lengths and a plurality of connectors 120, 130, 132, 140 having various configurations for connecting the tubes 110 together to form an inverted, generally U-shaped framework. The tubes 110 are preferably constructed of polyvinyl chloride (PVC), although other suitable materials could also be used. The tubes 110 and connectors 120, 130, 132, 140 are hollow and define fluid passageways that allow water to pass throughout the entire framework.

An L-shaped connector 120 is configured to mate with two tubes 110 and is utilized to form each lower corner of the framework. Similarly, three tubes 110 are mated with the mutually perpendicular ends of another connector 130 to connect horizontally disposed tubes with an upstanding tube as in the upstanding side segment 152 as shown in FIG. 1. Another connector 132 having three irregularly spaced apart ends is utilized to connect three tubes 110 together to form top 170 and sloped side 160 segments adjacent the first 172 and second 174 ends of the framework. In like manner, four tubes 110 are mated with a connector 140 having four irregularly spaced apart ends to form the sloped side segment 160 of the framework. Additional tubes 110 mate with connectors 140 of each sloped side segment 160 to form the top portion 170.

The ends of each tube 110 present equal exterior diameters. The hollow ends of each connector present equal interior diameters. The tubes are sized to mate tightly within the openings of the connectors 120, 130, 132, 140 so as to substantially prevent leakage of water flowing through the framework.

Figure 6A:
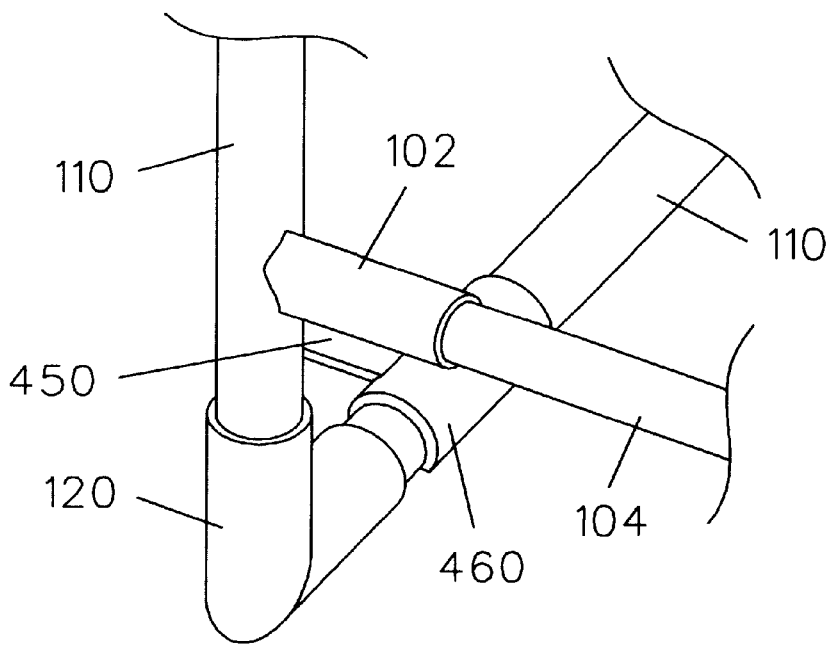
FIG. 6A is a broken view of the apparatus of FIG. 1 showing the apparatus connected to a water source.

An adapter 102 is integral to one of the tubes 110 adjacent the lower end thereof (FIGS. 1 and 6A). A free end of the adapter 102 is configured to connect to the externally threaded end of a garden hose 104. Water entering the framework through the adapter 102 passes throughout the tubular network, filling each tube 110 and connector 120, 130, 132, 140. Thus, an equal water pressure is established in every tube 110 for dispensing the water as to be described below.

Figure 3:
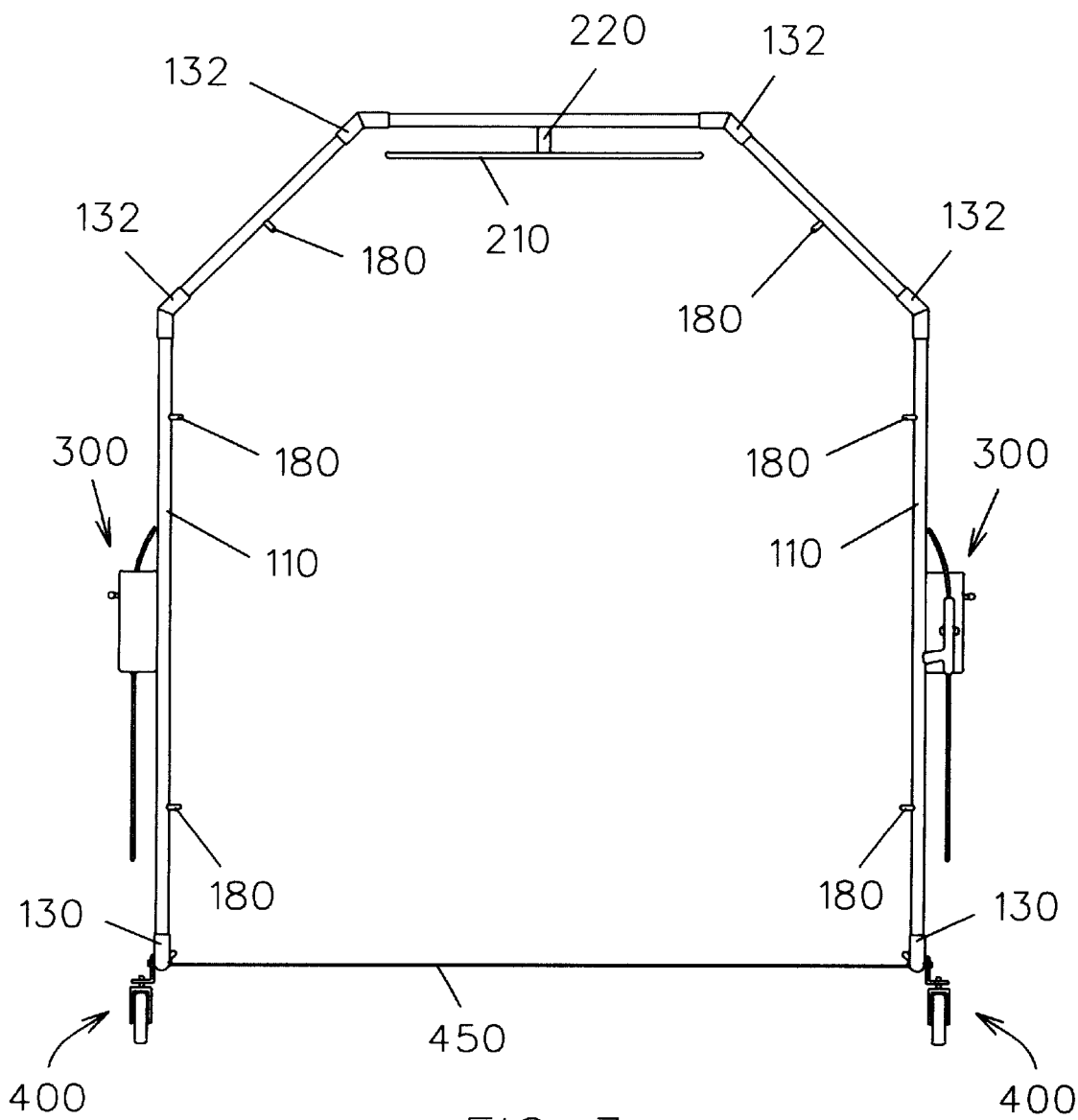
FIG. 3 is a rear view of the apparatus of FIG. 1.
Figure 4:
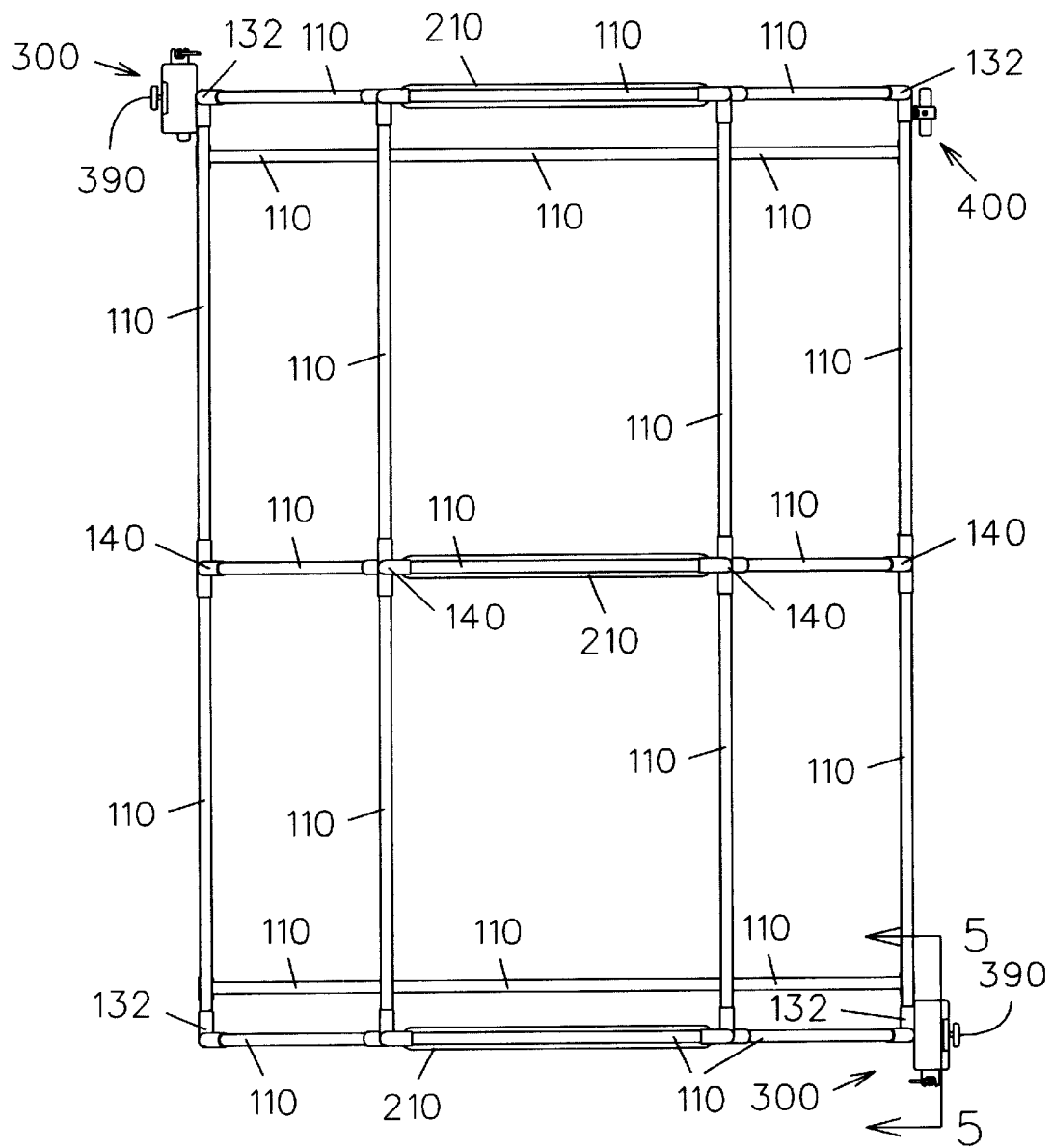
FIG. 4 is a top view of the apparatus of FIG. 1.
Figure 5:
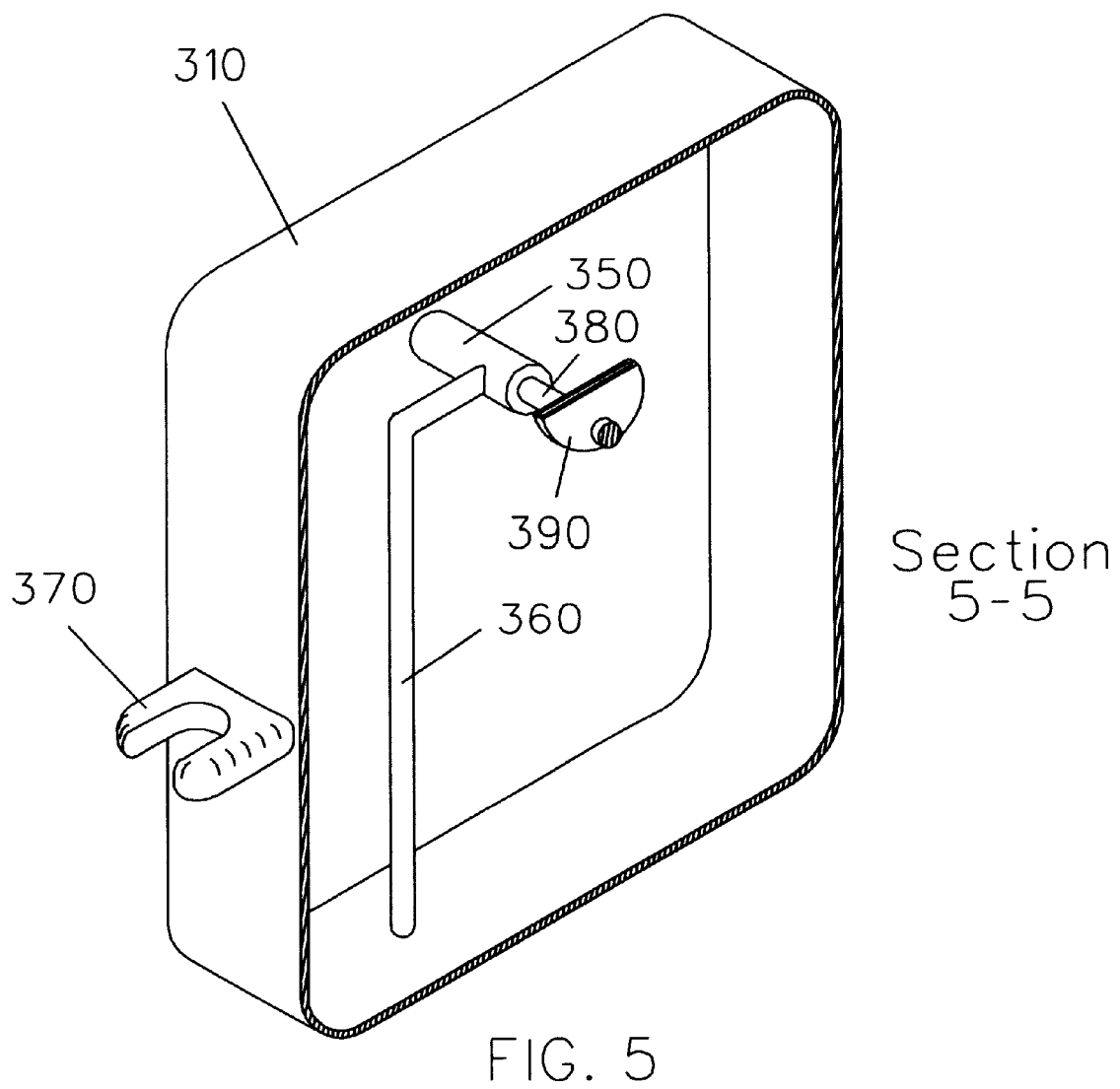
FIG. 5 is a section view taken along line 5—5 of FIG. 4 showing a coin box removed from the apparatus.
Figure 7:
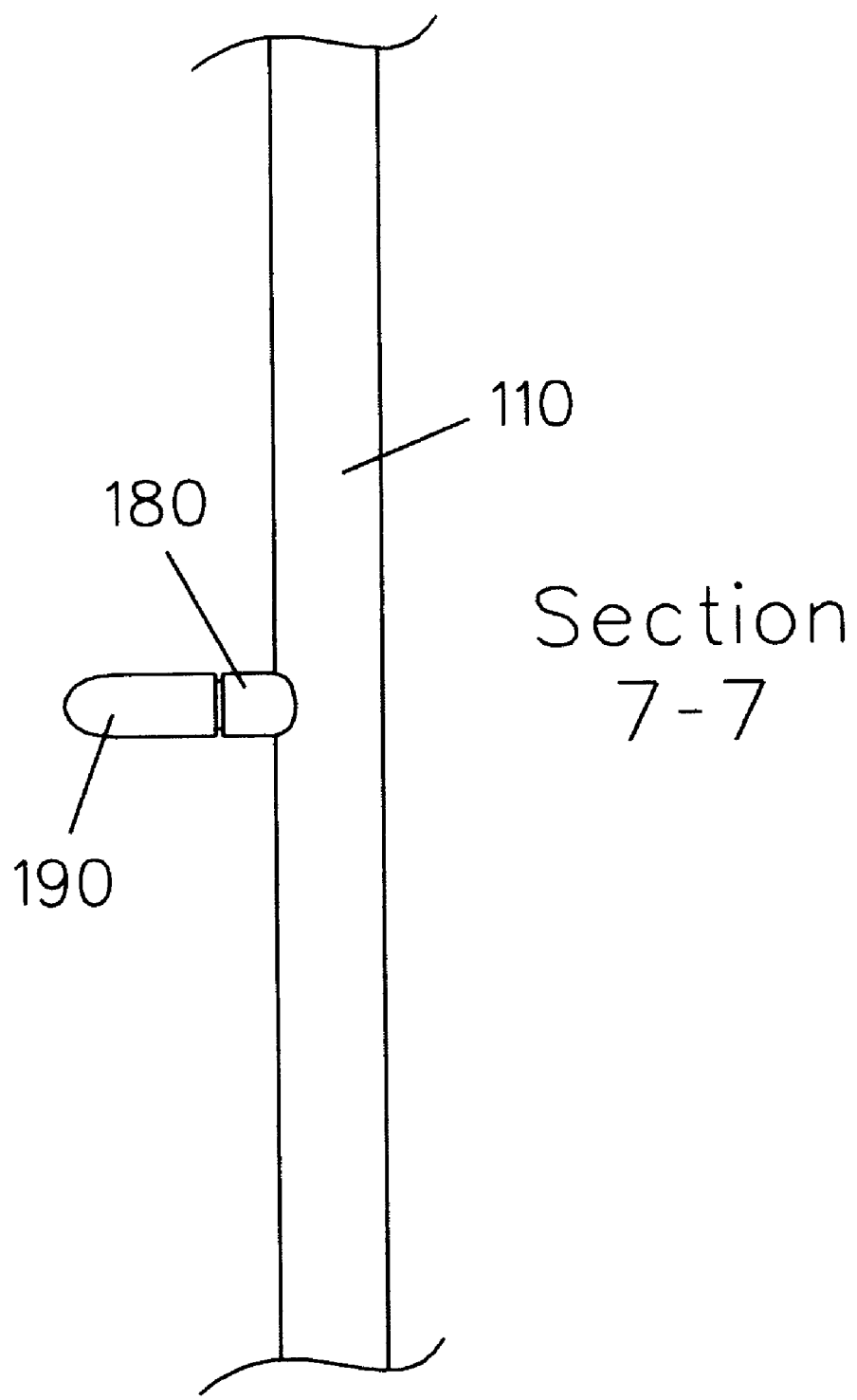
FIG. 7 is a view of the apparatus taken from line 7—7 of FIG. 1 showing a tube and nozzle.

As shown in FIGS. 3 and 7, at least one nozzle 180 is coupled to each tube 110 of the upstanding side 152 and sloped 160 segments for horizontally and angularly dispensing water, respectively, into the interior space of the housing. Each nozzle 180 includes an actuation head 190 that can be rotated by a user to selectively vary the amount and velocity of water dispensed therefrom. Each actuation head 190 can be completely closed, completely opened, or partially opened. Thus, the water dispensed from each nozzle 180 can be in the form of a mist, dribble, full dynamic flow, etc.

The car wash apparatus 100 includes a variety of other water dispensing components. Linear connectors 220 connect sprinklers 200 to the lower side of each tube 110 of the top portion 170 (FIG. 3) Each sprinkler 200 includes a hollow propeller 210 that is rotatably actuated by water flowing therethrough.

The apparatus 100 further includes a plurality of hand held spray gun assemblies 300 for simulating the wand type sprayers of a conventional car wash. Each assembly 300 includes a coin box 310 mounted to an upstanding tube 110 of a side portion 150. Each assembly 300 further includes a pistol grip sprayer 330 having a flexible outlet tube 340. Valves 350 integrally extend from the tubes 110 and into each coin box 310. An elongated hose 360 couples each valve 350 to a sprayer 330. A flange 370 is fixedly attached to the exterior of the coin box 310 for holding sprayer 330 when not in use. The valve 350 is actuated to allow water to flow through the hose 360 and sprayer 330 upon rotation of a shaft 380, the shaft being fixedly attached to a coin acceptor 390. It should be understood that while the coin acceptor can receive and deposit a coin into the coin box 310, water flow to the sprayer 330 may be actuated by turning the acceptor 390 whether or not a coin is actually deposited. The coin box 310 includes a front panel 320 hingedly attached to the coin box 310 which may be opened to retrieve coins deposited therein.

Figure 6B:
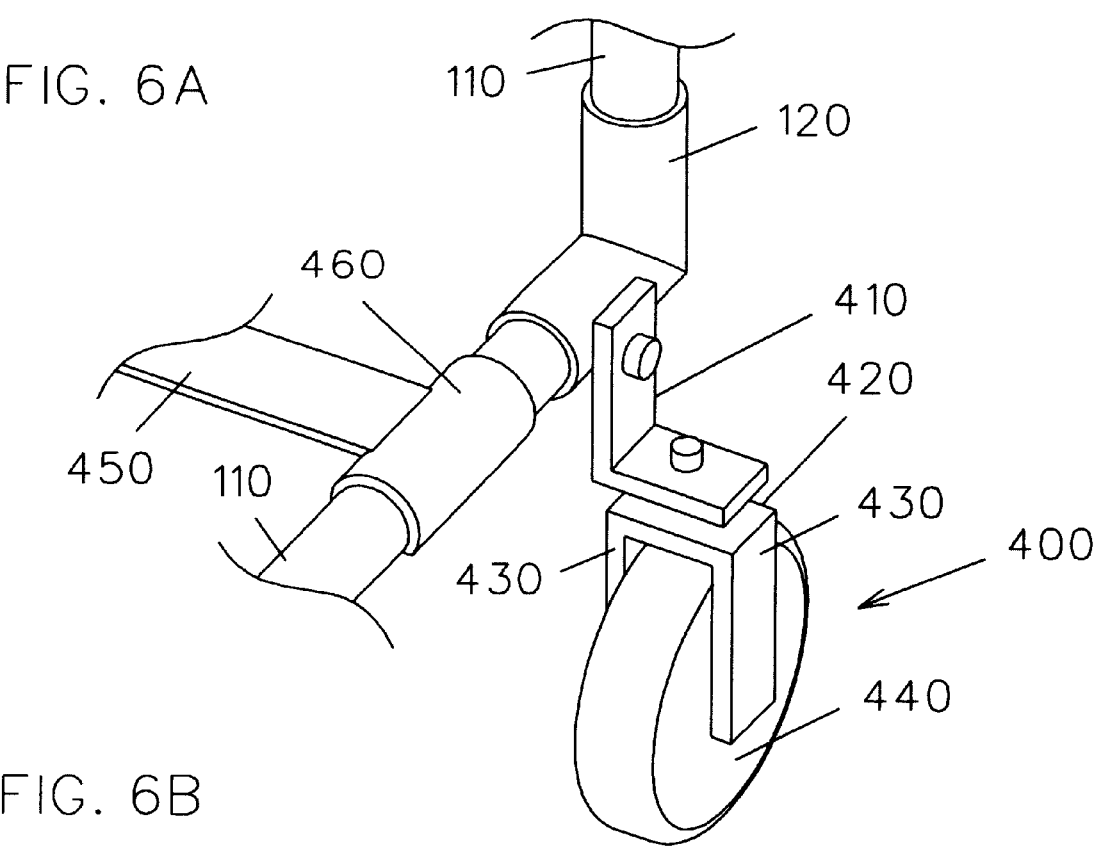
FIG. 6B is a broken view of the apparatus of FIG. 1 showing a wheel assembly attached to the tubular framework.

As best shown in FIG. 6B, a pair of wheel assemblies 400 are pivotally mounted to laterally opposed L-shaped connectors 120 of the second end with brackets 410. A guide member 420 having a pair of outwardly extending parallel flanges 430 is rotatably attached to each bracket 410, the flanges 430 extending about the sides of a wheel 440. An axle is attached to the free ends of the flanges 430 and extends through each wheel 440 such that each wheel 440 is freely rotatable about an axle. The wheel assemblies 400 may be pivoted to a vertical configuration that supports the back end 174 of the apparatus 100 in an elevated position for rolling the apparatus 100 to a desired lateral and longitudinal location. The wheel assemblies 400 may then be pivotally retracted to a horizontal configuration adjacent the upstanding side segments 150 such that the framework rests on the ground during use.

The apparatus 100 includes a pair of elongated bars 450 having annular flanges 460 integrally attached to opposed ends thereof. The flanges 460 may be frictionally fitted with horizontally disposed tubes 110 on opposed side portions 150 of the framework. Thus, the bars 450 extend between the side portions 150 for maintaining the preferred framework configuration during movement of the apparatus 100 (FIGS. 3 and 6).

The tubular framework is covered with a tarp-like cover 520 to further simulate an actual car wash. The side portions 150 and top 170 portion are covered while the first 172 and second 174 ends remain open for user entry. The cover 520 can be transparent or opaque and may include colorful indicia that is attractive to children.

The apparatus 100 further includes a slide 500 preferably constructed of a slick synthetic material. The slide can extend through the open first 172 and second 174 ends of the housing. The slide 500 can be releasably attached to tubes 110 that are adjacent the ground with string 510, wires, or other suitable fasteners. The slide 500 provides a slick, lubricous surface conducive for sliding when wetted with water dispensed from the apparatus 100.

In use, the tubes 110 are frictionally connected with the variously configured connectors 120, 130, 132, 140 to form the FIG. 1 framework. The framework can permanently remain in this configuration or be disassembled for storage. The wheel assemblies 400 can be pivoted to a vertical configuration to facilitate movement of the framework to a desired location while assembled. Bars 450 can be fitted to tubes 110 of the side portions 150 to enhance stability of the framework during movement. When the framework is in the desired location, the wheels can be pivoted to a horizontal position and the bars 450 can be removed.

The slide 500 can be releasably attached to tubes 110 of the framework if sliding through the framework is desired. The tubes 110 and connectors 120, 130, 132, 140 are filled with water by connecting a garden hose 104 to the adapter 102 and turning on the water flow. Each nozzle 180 can then be selectively actuated to the desired level of water flow by gradually rotating each nozzle actuation head 190. Use of a sprayer 330 is actuated by rotating the coin acceptor 390 on the coin box 310 whether or not a coin is actually deposited therein.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A portable, toy-vehicle cleaning device, comprising:

a housing presenting a top and a pair of opposed side walls, and defining first and second open ends, the housing including a liquid dispensing framework of interconnected tubes;

means for coupling the framework with a pressurized source of liquid;

a plurality of nozzles coupled with the framework for dispensing liquid into the housing; and a pair of wheel assemblies each wheel assembly including:

a bracket pivotally attached to the second end for pivotal movement between a first vertical configuration for supporting the second end above a ground surface and a second horizontal configuration at which the second end bears against a round surface; and a wheel pivotally attached to the bracket for permitting selective lateral and longitudinal placement of the housing when the bracket is at the first configuration.

2. A toy-vehicle cleaning device as in claim 1 wherein the pair of each wheel is retractable from the first configuration to the second configuration for permitting the housing to bear against a ground surface following a desired placement of the housing.

3. A toy-vehicle cleaning device as in claim 1 wherein the framework is configured in the form of a drive-through car wash structure.

4. A toy-vehicle cleaning device as in claim 1 wherein each nozzle includes an actuator adapted to be rotated by a user for adjusting the flow of liquid through the nozzle.

5. A toy-vehicle cleaning device as in claim 1 wherein the framework includes a plurality of connectors having various configurations for connecting the tubes together.

6. A toy-vehicle cleaning device as in claim 5 wherein each of the tubes includes first and second ends presenting identical exterior diameters;

each of the connectors includes at least two hollow ends defining identical interior diameters, whereby the exterior diameters of the tubes are configured to mate tightly with the interior diameters of the ends of the connectors for providing a removable friction fit coupling that substantially inhibits leakage between connected tubes.

7. The toy-vehicle cleaning device as in claim 1 further comprising a cover adapted to cover the housing, the cover being transparent to facilitate viewing of play activity within the framework.

8. A toy-vehicle cleaning device as in claim 1 wherein each nozzle includes an actuator adapted to be rotated by a user for adjusting the flow of liquid through the nozzle.

9. The toy-vehicle cleaning device as in claim 1 further comprising a cover adapted to cover the housing, the cover being transparent to facilitate viewing of play activity within the framework and including colorful indicia thereon.

10. The toy-vehicle cleaning device as in claim 1 further comprising a bar having spaced apart ends releasably coupled to the side walls of the housing to enhance the stability of the housing during movement thereof.

11. A toy-vehicle cleaning device wash, comprising:

a housing presenting a top and a pair of side walls, and defining first and second open ends, the housing including a liquid-conveying framework of interconnected tubes, the side walls each including first and second segments defining an angle therebetween;

means for coupling the framework with a pressurized source of liquid;

a plurality of nozzles coupled with the framework for dispensing liquid into the housing; and a slide extending through the first and second ends of the housing the slide being releasably attached to the framework for holding the slide between the side walls while a user slides or moves a play object between first and second ends.

* * * * *